United States Patent
Kawazoe et al.

(10) Patent No.: US 10,534,085 B2
(45) Date of Patent: Jan. 14, 2020

(54) LASER RADAR DEVICE AND TRAVELING BODY

(71) Applicant: MITSUBISHI HEAVY INDUSTRIES, LTD., Tokyo (JP)

(72) Inventors: Kohei Kawazoe, Tokyo (JP); Takahiro Kubota, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 156 days.

(21) Appl. No.: 15/553,247

(22) PCT Filed: Nov. 19, 2015

(86) PCT No.: PCT/JP2015/082562
§ 371 (c)(1),
(2) Date: Aug. 24, 2017

(87) PCT Pub. No.: WO2016/151938
PCT Pub. Date: Sep. 29, 2016

(65) Prior Publication Data
US 2018/0038957 A1    Feb. 8, 2018

(30) Foreign Application Priority Data
Mar. 23, 2015    (JP) .................. 2015-060070

(51) Int. Cl.
*G01C 3/08*    (2006.01)
*G01S 17/42*    (2006.01)
(Continued)

(52) U.S. Cl.
CPC .......... *G01S 17/42* (2013.01); *B61L 15/0081* (2013.01); *G01S 7/4817* (2013.01); *G01S 7/4865* (2013.01); *G01S 17/89* (2013.01)

(58) Field of Classification Search
CPC ...... G01S 17/42; G01S 7/4816; G01S 7/4817; G01S 7/4865; G01S 17/89; G01S 17/936;
(Continued)

(56) References Cited

U.S. PATENT DOCUMENTS 5,805,275 A    9/1998    Taylor
5,933,225 A *  8/1999    Yamabuchi ............. G01S 7/481
                                                            180/169
(Continued)

FOREIGN PATENT DOCUMENTS

DE    102005049471 A1    5/2007
DE    102013215627 A1    2/2015
(Continued)

OTHER PUBLICATIONS

Extended European Search Report, dated Sep. 7, 2018, for corresponding European Application No. 15886490.0.
(Continued)

*Primary Examiner* — Samantha K Abraham
(74) *Attorney, Agent, or Firm* — Birch, Stewart, Kolasch & Birch, LLP (57) ABSTRACT

A laser light source; a light sending lens configured to form laser light emitted from the laser light source into a spot shape; a scanner configured to perform irradiation while performing scanning, with the laser light formed into the spot shape, in a horizontal direction and a vertical direction of an area to be measured; a light receiving lens configured to receive reflected light reflected from the area to be measured; a light receiving optical system configured to condense the reflected light received by the light receiving lens, in each of the horizontal direction and vertical direction; and an information generating unit configured to gen-
(Continued)

erate, based on a received signal output by the light receiving element, three dimensional information of the area to be measured.

4 Claims, 5 Drawing Sheets

(51) Int. Cl.
  *G01S 17/89* (2006.01)
  *B61L 15/00* (2006.01)
  *G01S 7/481* (2006.01)
(58) Field of Classification Search
  CPC ...... B61L 15/0081; B61L 23/00; G01B 11/24; G01C 3/06; G02B 19/0014; G02B 26/101; G02B 27/0955; G08G 1/16
  See application file for complete search history.

(56) References Cited

U.S. PATENT DOCUMENTS

| | | |
|---|---|---|
| 9,007,600 B2 | 4/2015 | Imaki et al. |
| 2004/0114205 A1 | 6/2004 | Richman et al. |
| 2008/0024795 A1 | 1/2008 | Yamamoto et al. |
| 2013/0027715 A1 | 1/2013 | Imaki et al. |

FOREIGN PATENT DOCUMENTS

| | | | |
|---|---|---|---|
| JP | 5-107043 A | | 4/1993 |
| JP | 6-138229 A | | 5/1994 |
| JP | 6-258040 A | | 9/1994 |
| JP | 9-113234 A | | 5/1997 |
| JP | 2002-243543 A | | 8/2002 |
| JP | 2005-55196 A | | 3/2005 |
| JP | 2008-26243 A | | 2/2008 |
| JP | 2014-6110 A | | 1/2014 |
| JP | 5602225 B2 | | 10/2014 |
| WO | WO 2011/138895 A1 | | 11/2011 |
| WO | WO-2011138895 A1 * | 11/2011 | ........... G01S 7/4816 |

OTHER PUBLICATIONS

Japanese Office Action, dated Sep. 25, 2018, for corresponding Japanese Application No. 2015-060070, with an English machine translation.

International Preliminary Report on Patentability and English translation (Form PCT/IPEA/409), dated Apr. 18, 2017, for International Application No. PCT/JP2015/082562.

* cited by examiner

LASER RADAR DEVICE AND TRAVELING BODY

FIELD

The present invention relates to a laser radar device that generates three dimensional information of an area to be measured by performing scanning with laser light, and to a traveling body.

BACKGROUND

A laser radar device, which generates three dimensional information of an area to be measured from a distribution of received light signals obtained by: irradiating an area to be measured with laser light while scanning the area to be measured with the laser light; and a light receiving element receiving reflected light from an object or the like that is preset in this area to be measured, has been generally known. A laser radar device of this type has a scanner provided in each of a laser light sending side and a reflected light receiving side, and causes reflected light to be incident on a light receiving element by adjusting, as required, a mirror angle (an acceptance angle of the reflected light) of the scanner at the light receiving side according to a mirror angle (a light sending angle of laser light) of the scanner at the light sending side upon scanning. Because of the provision of the scanners at both the light sending side and light receiving side, this configuration has had a problem that the laser radar device as a whole is increased in size.

In order to solve the above described problem, a laser radar device that is not provided with a scanner at a light receiving side thereof has been conventionally proposed (see Patent Literature 1). This laser radar device realizes scanlessness at the light receiving side while achieving a wide two dimensional visual field, by having: a long light receiving element array, which has long light receiving elements arrayed in a direction orthogonal to a long direction of the light receiving elements; a transimpedance amplifier array that amplifies received signals; and an adder circuit that adds together the received signals from respective elements of the transimpedance amplifier array.

CITATION LIST

Patent Literature

Patent Literature 1: Japanese Patent No. 5602225

SUMMARY

Technical Problem

However, since the conventional configuration has the long light receiving element array having the long light receiving elements arrayed in the direction orthogonal to the long direction of the light receiving elements, the conventional configuration has had a problem that the long light receiving element array as a whole is increased in size. Further, because of the need for the adder circuit that adds together the received signals received by the respective arrayed long light receiving elements, there has been a problem that the device configuration and signal processing become complicated.

The present invention has been made in view of the above, and aims to provide a laser radar device and a traveling body that enable their light receiving elements to be downsized, and scanlessness at light receiving sides thereof to be realized with simple configurations.

Solution to Problem

To solve the above described problem and achieve the aims, a laser radar device according to the present invention includes a laser light source, a light sending lens configured to form laser light emitted from the laser light source, into a spot shape, a scanner configured to perform irradiation while performing scanning, with the laser light formed into the spot shape, in a first direction and a second direction of an area to be measured, the second direction being orthogonal to the first direction, a light receiving lens configured to receive reflected light reflected from the area to be measured, a light receiving optical system configured to condense the reflected light received by the light receiving lens, in each of the first direction and the second direction, a light receiving unit configured to receive the reflected light condensed by the light receiving optical system, and output a received signal based on laser light included in the reflected light that has been received, and an information generating unit configured to generate, based on the received signal output by the light receiving unit, three dimensional information of the area to be measured.

According to this configuration, since the light receiving optical system that condenses the reflected light received by the light receiving lens in each of the first direction and second direction, and the light receiving unit that receives the reflected light that has been condensed by the light receiving optical system and outputs the received signal based on the laser light included in the reflected light that has been received are included, the light receiving element of this light receiving unit is able to be downsized, and the entire area to be measured is able to be contained in a visual field of the sensor of the light receiving element, and thus scanlessness at a light receiving side thereof is able to be realized with a simple configuration.

In this configuration, the light receiving unit may have a single light receiving element. According to this configuration, since the entire area to be measured is able to be contained in the visual field of the sensor of the single light receiving element, an adder circuit that adds together received signals of light receiving elements is not needed and simplification of the circuit configuration is able to be realized.

Further, the light receiving optical system may include a relay lens that is arranged near or after an image formation position of the light receiving lens, and a condensing lens configured to condense, toward the light receiving unit, parallel light flux transmitted from the relay lens. According to this configuration, the image formation information of the light receiving lens is able to be condensed to the light receiving unit with a simple configuration combined of two types of lenses.

Further, the information generating unit may be configured to generate the three dimensional information of the area to be measured from distance information to the area to be measured obtained from a light turnaround time between the irradiation with the laser light and the light reception by the light receiving unit, and position information of each of the first direction and the second direction obtained based on light sending control angles of the scanner upon the irradiation with the laser light. According to this configuration, since obtainment of coordinates of spatial positions of received signals by visual field scanning at the light receiving side is not needed, load of signal processing for generation of three dimensional information is able to be reduced.

Further, the above described laser radar device may be installed in a traveling body. According to this configuration, three dimensional information of a traveling route of the traveling body is able to be obtained at all times, and driving assistance of the traveling body is able to be executed.

Advantageous Effects of Invention

According to the present invention, since a light receiving optical system that condenses reflected light received by a light receiving lens in each of a first direction and a second direction, and a light receiving unit, which receives the reflected light that has been condensed by the light receiving optical system, and which outputs a received signal based on laser light included in the reflected light that has been received, are included, a light receiving element of this light receiving unit is able to be downsized, and the entire area to be measured is able to be contained in a visual field of a sensor of the light receiving element, and thus scanlessness at a light receiving side thereof is able to be realized with a simple configuration.

DESCRIPTION OF EMBODIMENTS

Hereinafter, an embodiment according to the present invention will be described in detail, based on the drawings. The present invention is not limited by this embodiment. Further, components in the embodiment include any component that is easily substitutable by those skilled in the art or any component that is substantially identical thereto. Furthermore, the components described below may be combined with one another, as appropriate.

Figure 1:
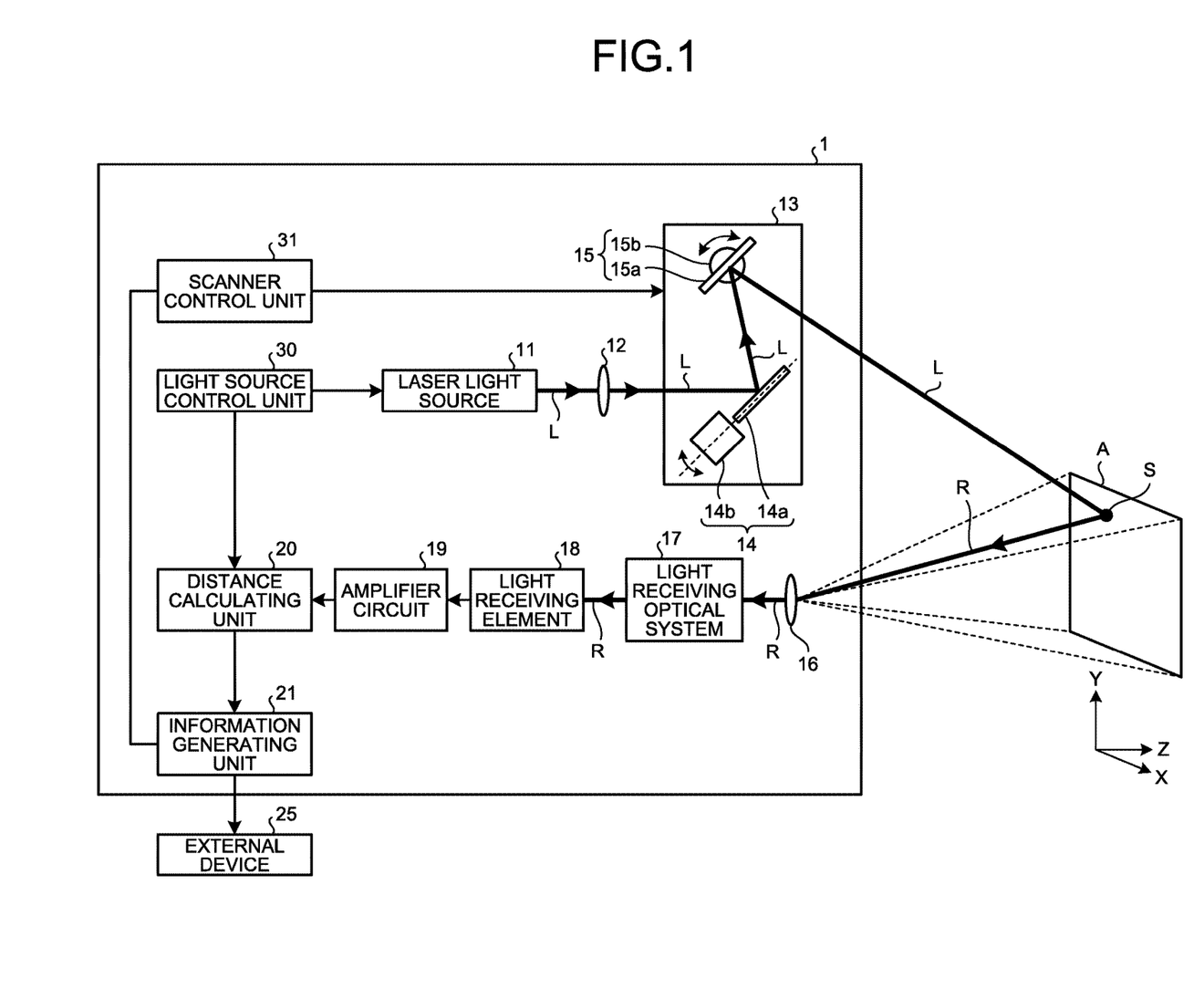
FIG. 1 is a diagram of a schematic configuration of a laser radar device according to an embodiment of the present invention.

FIG. 1 is a diagram of a schematic configuration of a laser radar device according to an embodiment of the present invention. As illustrated in FIG. 1, a laser radar device 1 performs irradiation while performing scanning, with laser light L, in a horizontal direction (first direction) X of a predetermined area to be measured A that has been set beforehand, and in a vertical direction (second direction) Y orthogonal to this horizontal direction X, and generates three dimensional information of the area to be measured A by receiving reflected light R of this laser light L. This laser radar device 1: is installed, for example, forward in a traveling direction of a vehicle (traveling body), such as a train that travels on a railroad; and generates the three dimensional information of the area to be measured A set in the traveling direction of the vehicle. Thereby, by utilization of the generated three dimensional information, whether or not an obstacle is present in the advancing direction of the vehicle is able to be determined.

The laser radar device 1 has, as illustrated in FIG. 1, a laser light source 11, a light sending lens 12, a scanner 13, a light receiving lens 16, a light receiving optical system 17, a light receiving element 18, an amplifier circuit 19, a distance calculating unit 20, an information generating unit 21, a light source control unit 30, and a scanner control unit 31. The light source control unit 30 controls operation of the laser light source 11. The scanner control unit 31 controls operation of the scanner 13. The light source control unit 30 has a master clock of the laser radar device 1, and sends out a pulsed light emission synchronization signal to the distance calculating unit 20, simultaneously with emission of the laser light L.

The laser radar device 1 performs irradiation while performing scanning, with the laser light L, in the horizontal direction X and the vertical direction Y, of the area to be measured A. The area to be measured A is an area set at a position away from the laser radar device 1 by a predetermined distance. When the laser radar device 1 is, for example, installed in a vehicle, such as a train, the area to be measured A is updated according to traveling of the vehicle, as required.

The laser light source 11 emits the laser light L. As the laser light L, for example, laser light having a wavelength of 200 nm to 2000 nm is used. In particular, when the laser radar device 1 is used in a large outdoor space, by use of laser light having a wavelength of 800 nm to 2000 nm, stable measurement is able to be realized. The laser light source 11 is, for example, formed of a laser diode, and emits the laser light L in a pulse like manner based on a light emission command of the light source control unit 30. The light sending lens 12 is formed of a single convex lens, or of a combination of a convex lens and a concave lens, and forms the laser light L emitted from the laser light source 11 into a spot shape (beam shape). The scanner 13 performs scanning with the laser light L formed in the spot shape, in each of the horizontal direction X and the vertical direction Y, of the area to be measured A.

The scanner 13 has a function of two dimensionally scanning the area to be measured A, and includes: a horizontal scanning unit 14 that performs scanning with the laser light L in the horizontal direction X; and a vertical scanning unit 15 that performs scanning with the laser light L in the vertical direction Y. The horizontal scanning unit 14 and the vertical scanning unit 15 are, for example, formed of galvanoscanners, and include galvanomirrors 14a and 15a, and driving motors 14b and 15b that swing mirror surfaces of the galvanomirrors 14a and 15a. Under control by the scanner control unit 31, the horizontal scanning unit 14 swings the galvanomirror 14a by driving the driving motor 14b. Thereby, a horizontal direction angle of the laser light L condensed by the light sending lens 12 is deflected by the galvanomirror 14a, and scanning with the laser light L in the horizontal direction X of the area to be measured A is performed. Further, under control by the scanner control unit 31, the vertical scanning unit 15 swings the galvanomirror 15a by driving the driving motor 15b. Thereby, a vertical direction angle of the laser light L reflected at the galvanomirror 14a is changed, and scanning is performed in the vertical direction Y of the area to be measured A. Although the configurations, in which the galvanoscanners are used, have been described as examples of the horizontal scanning unit 14 and the vertical scanning unit 15, not being limited to these configurations, for example, a polygon scanner having a polygon mirror may be used.

The scanner control unit 31 controls, based on a predetermined scanning pattern, operation of the driving motors 14b and 15b. Thereby, based on the scanning pattern, the area to be measured A is irradiated with the spot like laser light L, and spots (areas) in this irradiated area to be measured A sequentially become measurement spots S. In this case, mirror angles (light sending control angles) of the galvanomirrors 14a and 15a corresponding to each of the measurement spots S are obtained by the scanner control unit 31, and these mirror angles are sent out to the information generating unit 21. In this embodiment, the scanner 13 irradiates the area to be measured A while scanning the area to be measured A, with the spot like (beam like) laser light L. Thus, irradiation power density of the laser light L, with which the area to be measured A is irradiated, is increased, and signal intensity is able to be increased. Thereby, even under environmental conditions where transmissivity of the laser light L is low (for example, a foggy environment or a rainy environment), measurement performance is able to be maintained.

Further, the light receiving lens 16 receives the reflected light R reflected from the respective measurement spots S of the area to be measured A. The light receiving optical system 17 condenses the reflected light R received by the light receiving lens 16, in each of the horizontal direction X and the vertical direction Y.

Figure 2:
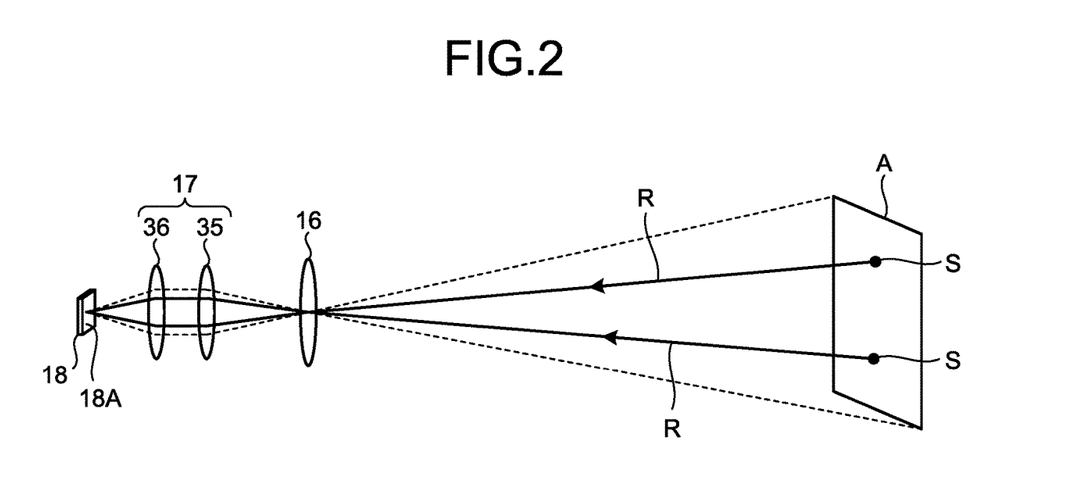
FIG. 2 is a schematic diagram illustrating a peripheral configuration including a light receiving optical system.

FIG. 2 is a schematic diagram illustrating a peripheral configuration including the light receiving optical system. As illustrated in FIG. 2, the reflected light R reflected at the respective measurement spots S of the area to be measured A is respectively received by the light receiving lens 16. This light receiving lens 16 forms an image of each of the measurement spots S at a predetermined position (image formation position) downstream from the light receiving lens 16.

The light receiving optical system 17 includes a relay lens 35 that is arranged at the image formation position of the light receiving lens 16, and a condensing lens 36 that is arranged downstream from this relay lens 35. In FIG. 2, although the configuration having one each of the relay lens 35 and the condensing lens 36 is adopted, of course, a lens unit having a combination of plural relay lenses 35 and plural condensing lenses 36 may be adopted. The relay lens 35: is formed of a convex lens; is a lens that makes light flux thereafter substantially parallel while maintaining image formation information of the light receiving lens 16 at the image formation position; and has a function of transmitting this image formation information, as is, to the condensing lens 36. Further, in this embodiment, although the relay lens 35 is configured to be arranged at the image formation position of the light receiving lens 16, not being limited thereto, the relay lens 35 may be arranged near the image formation position of the light receiving lens 16, or after the image formation position. The condensing lens 36 is formed of a convex lens, and has a function of condensing the parallel light flux transmitted from the relay lens 35, that is, all of the image formation information, toward the light receiving element 18, in the horizontal direction X and the vertical direction Y. Therefore, with a simple configuration combined of two types of lenses, the light receiving optical system 17 is able to condense the image formation information of the light receiving lens 16 to a light receiving surface 18A of the light receiving element 18 and to realize scanlessness at a light receiving side. The light receiving element 18 is formed of a photoelectric transducer (for example, a photodiode) that receives the reflected light R and converts the reflected light R into electric current, and is formed of a single element having a single pixel. Therefore, the laser light L that is shortly pulsed is able to be responded to.

The light receiving element 18 receives the reflected light R condensed by the light receiving optical system 17, and outputs a received signal based on the laser light L included in the received reflected light R. The amplifier circuit 19 amplifies the received signal output by the light receiving element 18 into a voltage signal. Since the received signal output by the light receiving element 18 is a weak current signal, the amplifier circuit 19 converts the current signal into the voltage signal and outputs the voltage signal to the distance calculating unit 20. In this embodiment, a light receiving unit is configured to include the light receiving element 18 and the amplifier circuit 19.

The distance calculating unit 20 calculates, based on the received signal amplified by the amplifier circuit 19, distance information of the measurement spot S of the area to be measured A. The distance calculating unit 20 receives the pulse like light emission synchronization signal sent out from the light source control unit 30 and the received signal sent out from the amplifier circuit 19, calculates a distance to the measurement spot S of the area to be measured A that has been irradiated with the laser light L, and sends out the distance information to the information generating unit 21. Specifically, based on the light emission synchronization signal and the received signal, the distance calculating unit 20 measures a time between the emission of the laser light L and the reception of the reflected light R, and calculates, based on this measured time, the distance to the measurement spot S, at which the laser light L has been reflected. Further, the distance calculating unit 20 may send out, together with the distance information, light reception intensity included in the received signal, to the information generating unit 21, in association with the distance information.

The information generating unit 21 generates, based on the distance information calculated by the distance calculating unit 20 and position information of the measurement spot S, the three dimensional information of the area to be measured A. Based on the distance information to the measurement spot S and the position information of the measurement spot S in the horizontal direction X and the vertical direction Y, the information generating unit 21 obtains coordinate information at the measurement spot S, and generates the three dimensional information of the area to be measured A from a distribution of coordinate information of plural measurement spots S present in the area to be measured A. The information generating unit 21 obtains mirror angles (light sending control angles) of the galvanomirrors 14a and 15a related to the measurement spot S sent out from the scanner control unit 31, and based on these mirror angles, calculates the position information of the measurement spot S in the horizontal direction X and the vertical direction Y. In this configuration, since obtainment of coordinates of spatial positions of received signals by visual field scanning at the light receiving side is not needed, load of signal processing for the generation of the three dimensional information is able to be reduced. The three dimensional information of the area to be measured A generated by the information generating unit 21 is transmitted to an external device (for example, a computer or the like of the vehicle) by wired or wireless communication, and utilized in this external device 25.

The condensing lens 36 of the laser radar device 1 of this embodiment condenses, to the light receiving surface 18A of the light receiving element 18 formed of a single element, all of the image formation information of the light receiving lens 16 transmitted from the relay lens 35. Therefore, since the reflected light R from any measurement spot S of the area to be measured A is condensed to the light receiving surface 18A of the light receiving element 18, the light receiving element 18 enables the entire area to be measured A to be contained in a sensor's visual field at all times. Therefore, reflected light from the area to be measured A is able to be treated as a single piece of information. Thereby, the conventional arrangement of plural light receiving elements and the conventional adder circuit that adds together received signals of these light receiving elements are not needed, and simplification of the circuit configuration is able to be realized. Further, in this embodiment, since the light receiving element 18 is formed of a single element formed of a single pixel, downsizing of the light receiving element 18 is able to be realized, and consequently, downsizing of the laser radar device 1 is able to be realized.

For example, by inclusion of the long light receiving element array having the long light receiving elements arrayed in the direction orthogonal to the long direction of the light receiving elements and the adder circuit that adds together the received signals of the respective long light receiving elements that are described in Japanese Patent No. 5602225, scanlessness at the light receiving side is realized while a wide two dimensional visual field is obtained. However, in this conventional technique, by the long light receiving elements being arrayed in the direction orthogonal to the long direction of the light receiving elements, the long light receiving element array may be increased in size, and the increase in size may be adverse to the aim for downsizing of the laser radar device. Further, because of the need for the adder circuit that adds together the received signals received by the respective arrayed long light receiving elements, there has been a risk that the device configuration may become complicated. On the contrary, since, by the provision of the light receiving optical system 17 in the laser radar device 1 as described above, the reflected light R from any measurement spot S of the area to be measured A is condensed to the light receiving surface 18A of the light receiving element 18; the light receiving element 18 enables the entire area to be measured A to be contained in the sensor's visual field at all times. Therefore, reflected light from the area to be measured A is able to be treated as a single piece of information, and downsizing is able to be realized.

One may consider a configuration, in which the light receiving element 18 having a single pixel is arranged at the image formation position of the light receiving lens 16. However, in this configuration, since an area of the light receiving surface 18A of the light receiving element 18 is extremely small as compared to an area of the image formation information at the image formation position of the light receiving lens 16; only a part of the area to be measured A is able to be contained in the sensor's visual field. Further, in order to obtain the sensor's visual field for the entire area to be measured A, a light receiving element formed of a single element having a light receiving surface equivalent to or larger than the image formation information at the image formation position of the light receiving lens 16 is needed, but when the pixel size is increased, there is a problem that responsiveness of the light receiving element (photodiode) is reduced.

In contrast, in this embodiment, the light receiving optical system 17 includes the relay lens 35 that is arranged at the image formation position of the light receiving lens 16 and the condensing lens 36 that is arranged downstream from this relay lens 35, and the condensing lens 36 condenses, to the light receiving surface 18A of the light receiving element 18 formed of a single element, all of the image formation information of the light receiving lens 16 transmitted from the relay lens 35, and thus without reduction in the responsiveness, information of the entire visual field that the light receiving lens 16 has is able to be covered regardless of the shape of the pixel of the light receiving element 18. Therefore, the light receiving element 18 is able to be formed of a rectangular, square, or circular single element sensor, and choice of the light receiving element is able to be widened.

Figure 3A:
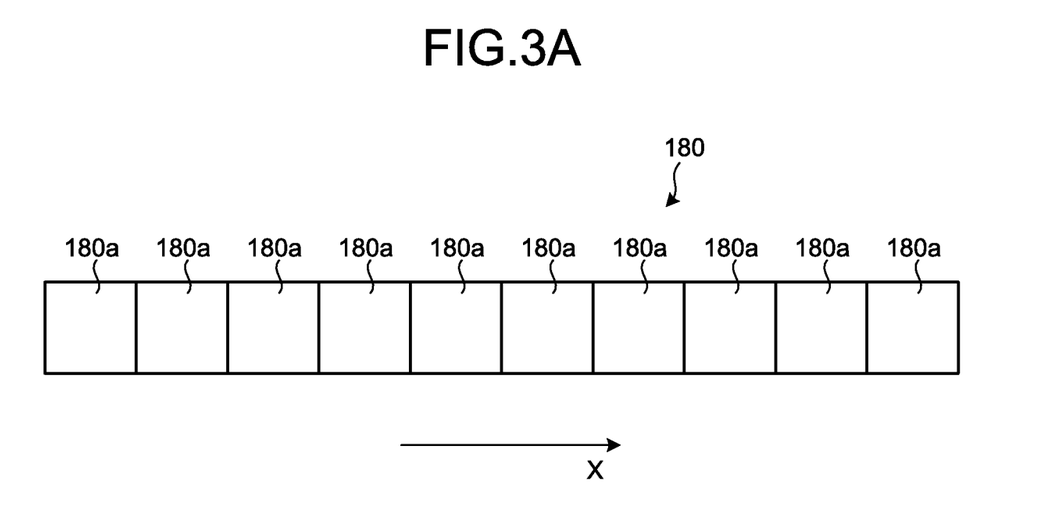
FIG. 3A is a diagram illustrating a modified example of a light receiving element.
Figure 3B:
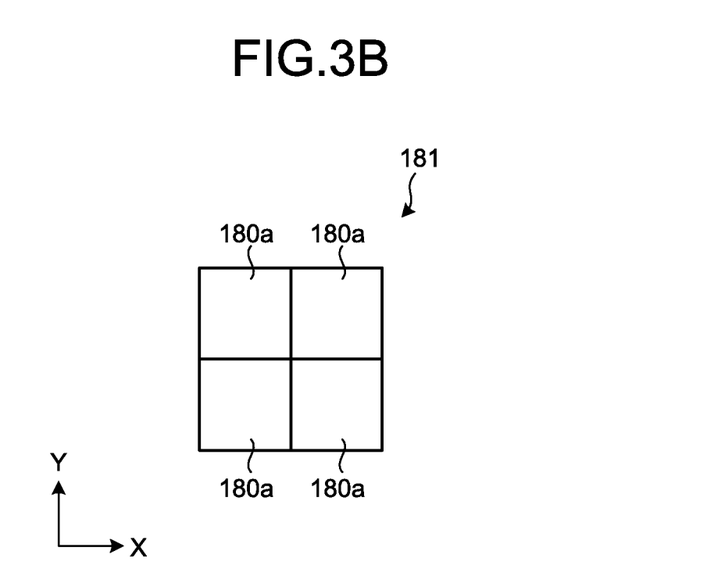
FIG. 3B is a diagram illustrating a modified example of the light receiving element.

Next, modified examples of the light receiving element will be described. FIG. 3A and FIG. 3B are diagrams illustrating modified examples of the light receiving element. In the above described embodiment, although the light receiving element 18 is configured to be formed of a single element having a single pixel, as illustrated in FIG. 3A, for example, a linear light receiving element (line sensor) 180, which is formed of single pixels 180a lined up in a predetermined direction (for example, horizontal direction X), may be used instead. In this configuration, even if, when the laser radar device 1 is in operation, the condensing position to the light receiving element via the light receiving lens 16, the relay lens 35, and the condensing lens 36 is deviated, or the condensing size is deviated from the optimum spot and is enlarged; the pixels 180a, to which the reflected light is condensed, of the linear light receiving element 180, are able to be used as the light receiving element. Accordingly, the reflected light is able to be infallibly received by the light receiving element, and quality of the measurement is able to be maintained. Further, not only the linear light receiving element (line sensor) 180, but also, as illustrated in FIG. 3B, a light receiving element group 181, which is formed of single pixels 180a lined up plurally (for example, two) each in the horizontal direction X and vertical direction Y, may be used instead.

Figure 4A:
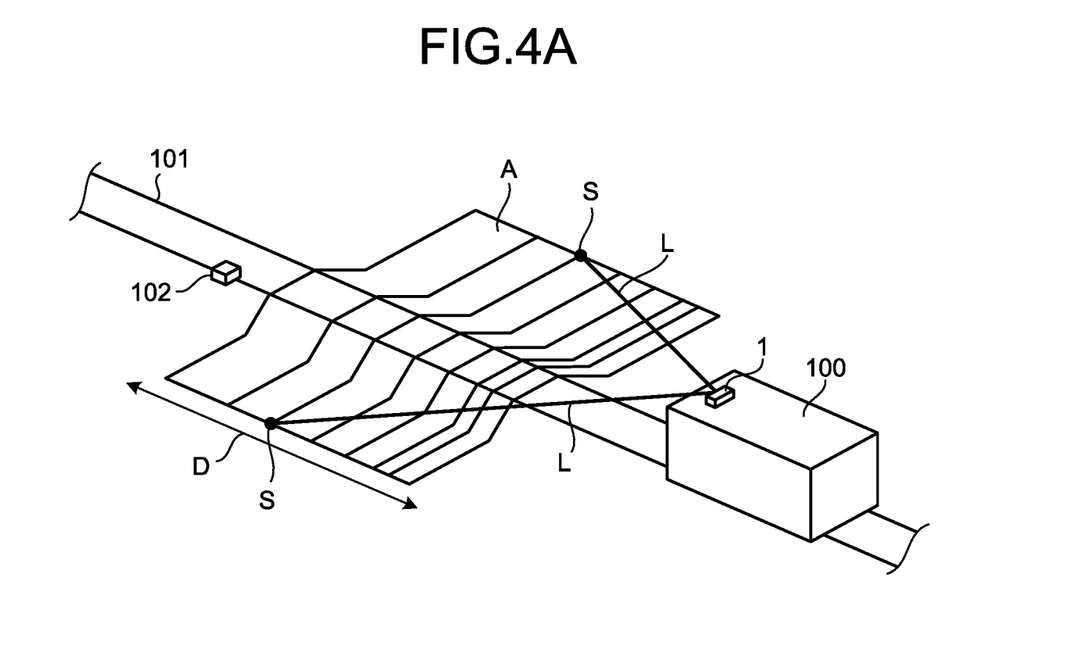
FIG. 4A is a perspective view illustrating a configuration having the laser radar device installed in a train traveling on a railroad.
Figure 4B:
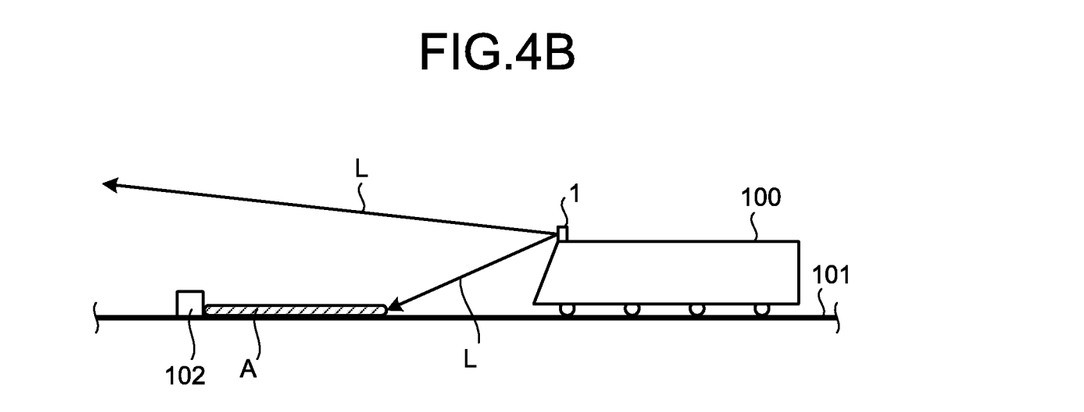
FIG. 4B is a side view illustrating the configuration having the laser radar device installed in the train traveling on the railroad.

Next, an example, to which the laser radar device 1 of this embodiment is applied, will be described. FIG. 4A is a perspective view illustrating a configuration having the laser radar device installed in a train that travels on a railroad, and FIG. 4B is a side view illustrating the configuration having the laser radar device installed in the train that travels on the railroad. In this application example, the laser radar device 1 is installed in a train (traveling body) 100. The train 100 travels on a railroad 101, and may be configured to be driven by operation of a driver, or may be configured to be automatically driven by a computer.

The laser radar device 1 is provided at a front side upper portion of the train 100, and monitors the area to be measured A set forward in a traveling direction of this train 100. As described above, since this laser radar device 1 is formed without provision of a receiving side scanner, downsizing of the laser radar device 1 is realized. Therefore, the train 100 installed with this laser radar device 1 enables reduction of free space in the train 100 due to an arrangement layout of the laser radar device 1, or influence of a portion protruding outside the train 100, to be kept to a bare minimum.

Specifically, the area to be measured A is set on a traveling road surface forward in the traveling direction, the traveling road surface including the railroad 101, over a predetermined distance D (for example, 300 m to 500 m) from the train 100, and this area to be measured A is updated, as required, according to traveling of the train 100. The laser radar device 1 performs irradiation while performing scanning, with the laser light L, directed to this area to be measured A, and based on the distance information and position information of the respective measurement spots S, generates the three dimensional information of the area to be measured A.

Although illustration thereof will be omitted, the train 100 includes, as the external device 25 (FIG. 1): a computer that obtains the three dimensional information of the area to be measured A output from the laser radar device 1; and a display that displays a shape of the area to be measured A drawn based on the three dimensional information by this computer. These computer and display are arranged in a driver's cab of the train 100.

In this configuration, the three dimensional information generated by the laser radar device 1 is output to the computer of the train 100 as required, and is displayed on the display, via this computer. Therefore, in a case where, for example, an obstacle 102 is present on the railroad 101, since a shape of the area to be measured A including this obstacle 102 is displayed on the display, the driver is able to be assisted with driving. Further, the configuration may be configured to, not only display the shape on the display, but also give a notice or an alarm indicating that the obstacle 102 is highly likely to be present, if a change in the shape in the traveling direction in the area to be measured A exceeds a predetermined threshold.

Further, in a configuration, in which the train 100 is automatically driven by a computer, when the obstacle 102 is present on the railroad 101, based on the three dimensional information generated by the laser radar device 1, safe automatic driving is able to be realized by stoppage of the train 100.

Figure 5:
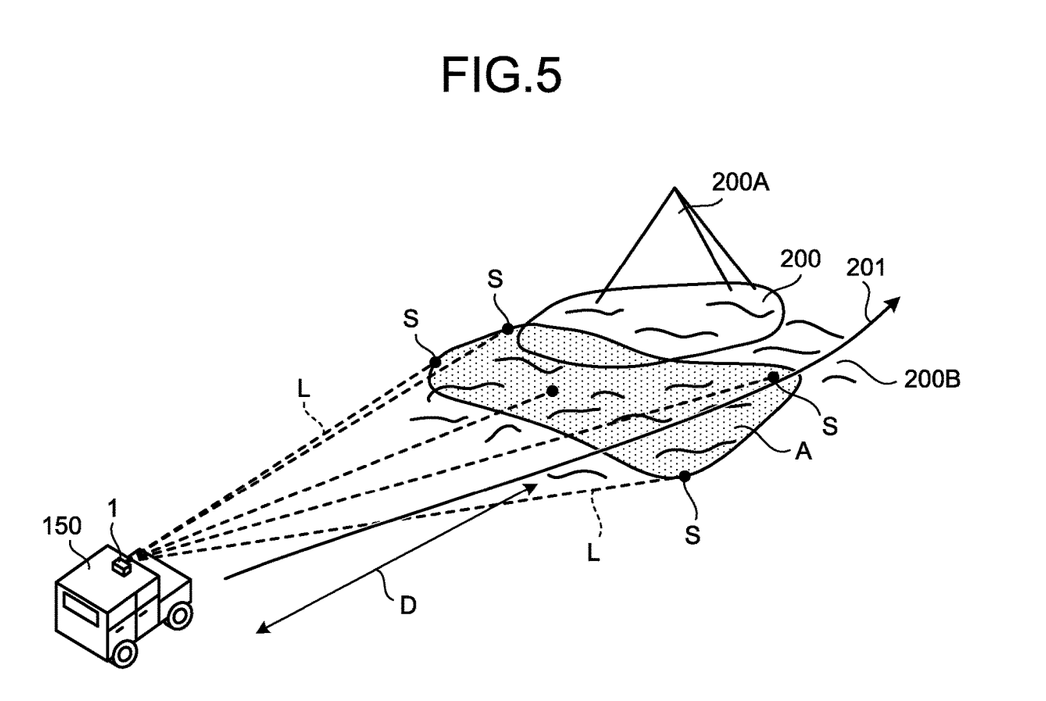
FIG. 5 is a perspective view illustrating a configuration having the laser radar device installed in a vehicle.

FIG. 5 is a perspective view illustrating a configuration having the laser radar device installed in a vehicle. In this application example, the laser radar device 1 is installed in a vehicle (traveling body) 150. The vehicle 150 freely travels on a road surface, and may be configured to be driven by operation of a driver, or may be configured to be automatically driven by a computer.

The laser radar device 1 is provided at a front side upper portion of the vehicle 150, and monitors the area to be measured A set on a landform 200 forward in a traveling direction of this vehicle 150. As described above, since this laser radar device 1 is formed without provision of a receiving side scanner, downsizing of the laser radar device 1 is realized. Therefore, the vehicle 150 installed with this laser radar device 1 enables reduction of free space in the vehicle 150 due to an arrangement layout of the laser radar device 1, or influence of a portion protruding outside the vehicle 150, to be kept to a bare minimum.

Specifically, the area to be measured A is set on a surface of the landform 200 forward in the traveling direction over a predetermined distance D (for example, 100 m) from the vehicle 150, and this area to be measured A is updated, as required, according to traveling of the vehicle 150. The laser radar device 1 performs irradiation while performing scanning, with the laser light L, directed to this area to be measured A, and based on the distance information and position information of the respective measurement spots S, generates three dimensional information of the area to be measured A (landform 200). In this FIG. 5, the landform 200 will be described as including a summit portion 200A that is largely undulating, and a flat portion 200B with small undulations.

The vehicle 150 includes, although illustration thereof will be omitted, as the external device 25 (FIG. 1), a navigation device that performs navigation of this vehicle 150. This navigation device includes a control unit that controls the whole navigation device, and a display that displays a route (map information), and the three dimensional information of the area to be measured A is output to the control unit. The navigation device sets, based on the three dimensional information of the area to be measured A, a route 201 passing the flat portion 200B with small undulations, by avoiding the summit portion 200A that is largely undulating. According to this configuration, even in a case where the landform 200 that is rugged is traveled, the route 201 including the flat portion 200B is able to be traveled preferably, and thus the driver is able to be assisted with driving.

Further, in a configuration, in which the vehicle 150 is automatically driven by a computer, based on the three dimensional information generated by the laser radar device 1, safe automatic driving is able to be realized by the route 201 including the flat portion 200B being preferably traveled.

In the above described application examples, the configurations, in which the laser radar device 1 is installed in traveling bodies such as the train 100 and the vehicle 150, have been described, but as long as the laser radar device 1 is installed in a traveling body that is self-propelled, the embodiment is not limited to these examples. Further, in the above described application examples, the laser radar device 1 is installed in the traveling bodies, but for example, the laser radar device 1 may be configured: to be arranged on a support pillar provided to stand beside an intersection, a railroad crossing, or the like where the area to be measured A is set, so as to look down upon the area to be measured A; and to generate the three dimensional information of the area to be measured A by performing irradiation while performing scanning, with the laser light L, in the horizontal direction X and vertical direction Y, and receiving the reflected light R from an object in the area to be measured A (for example: a moving object, such as a pedestrian, a bicycle, a two wheeled vehicle, or an automobile; or a stationary object, such as a building, a guardrail, or a tree).

As described above, because the laser radar device 1 according to this embodiment includes the laser light source 11, the light sending lens 12 that forms the laser light L emitted from the laser light source 11 into a spot shape, the scanner 13 that performs irradiation while performing scanning, with the laser light L that has been formed in the spot shape, in the horizontal direction X and vertical direction Y of the are to be measured A, the light receiving lens 16 that receives the reflected light R reflected from the area to be measured A, the light receiving optical system 17 that condenses the reflected light R received by the light receiving lens 16 in each of the horizontal direction X and vertical direction Y, the light receiving element 18 that receives the reflected light R that has been condensed by the light receiving optical system 17, and the information generating unit 21 that generates, based on the received signal output by the light receiving element 18, the three dimensional information of the area to be measured A; downsizing of the light receiving element 18 is able to be achieved, and the entire area to be measured A is able to be contained in the sensor's visual field of the light receiving element 18, and thus scanlessness at the light receiving side is able to be realized with a simple configuration.

Further, according to this embodiment, since the light receiving element 18 is formed of a single element having a single pixel, the entire area to be measured A is able to be contained in the sensor's visual field of the single element. Therefore, an adder circuit that adds together received signals of the light receiving element 18 is not needed, and simplification of the circuit configuration is able to be realized.

Further, according to this embodiment, because the light receiving optical system 17 includes the relay lens 35, which is arranged at the image formation position of the light receiving lens 16, and performs transmission while maintaining the image formation information at the image formation position, and the condensing lens 36 that condenses the parallel light flux transmitted from the relay lens 35 toward the light receiving element 18; with a simple configuration combined of two types of lenses, the image formation information of the light receiving lens 16 is able to be condensed to the light receiving surface 18A of the light receiving element 18.

Further, according to this embodiment, because the information generating unit 21 generates the three dimensional information of the area to be measured A from the distance information to the measurement spot S of the area to be measured A obtained from the light turnaround time between the irradiation with the laser light L and the light reception by the light receiving element 18 and the position information of each of the horizontal direction X and vertical direction Y of the measurement spot S obtained based on the mirror angles of the scanner 13 upon the irradiation with the laser light L; obtainment of coordinates of spatial positions of received signals by visual field scanning at the light receiving side is not needed, and load of signal processing for the generation of the three dimensional information is able to be reduced.

Further, because the above described laser radar device 1 is installed in the train 100, or in the vehicle 150; the three dimensional information of the traveling route of the train 100 or the vehicle 150 is able to be obtained at all times, and driving assistance of the train 100 or the vehicle 150 is able to be executed.

REFERENCE SIGNS LIST

1 LASER RADAR DEVICE
11 LASER LIGHT SOURCE
12 LIGHT SENDING LENS
13 SCANNER
14 HORIZONTAL SCANNING UNIT
15 VERTICAL SCANNING UNIT
16 LIGHT RECEIVING LENS
17 LIGHT RECEIVING OPTICAL SYSTEM
18 LIGHT RECEIVING ELEMENT
18A LIGHT RECEIVING SURFACE
21 INFORMATION GENERATING UNIT
30 LIGHT SOURCE CONTROL UNIT
31 SCANNER CONTROL UNIT
35 RELAY LENS
36 CONDENSING LENS
100 TRAIN (TRAVELING BODY)
150 VEHICLE (TRAVELING BODY)
180 LINEAR LIGHT RECEIVING ELEMENT
180a SINGLE PIXEL
181 LIGHT RECEIVING ELEMENT GROUP
A AREA TO BE MEASURED
L LASER LIGHT
R REFLECTED LIGHT
S MEASUREMENT SPOT
X HORIZONTAL DIRECTION (FIRST DIRECTION)
Y VERTICAL DIRECTION (SECOND DIRECTION)

The invention claimed is:

1. A laser radar device, comprising:
a laser light source;
a light sending lens configured to form laser light emitted from the laser light source, into a spot shape;
a scanner configured to perform irradiation while performing scanning, with the laser light formed into the spot shape, in a first direction and a second direction of an area to be measured, the second direction being orthogonal to the first direction;
a light receiving lens configured to receive reflected light reflected from the area to be measured;
a light receiving optical system configured to condense the reflected light received by the light receiving lens, in each of the first direction and the second direction;
a light receiving unit configured to receive the reflected light condensed by the light receiving optical system, and output a received signal based on laser light included in the reflected light that has been received; and
an information generating unit configured to generate, based on the received signal output by the light receiving unit, three dimensional information of the area to be measured,
wherein the light receiving optical system includes a relay lens arranged near or after an image formation position of the light receiving lens configured to receive reflected light from an entire area to be measured according to scanning of the scanner, the relay lens making the reflected light received from the light receiving lens parallel and being configured to transmit to the light receiving unit, all of image formation information including the entire area to be measured that the light receiving lens forms an image, and a condensing lens configured to condense, toward the light receiving unit, light flux transmitted from the relay lens.

2. The laser radar device according to claim 1, wherein the light receiving unit has a single light receiving element.

3. The laser radar device according to claim 1, wherein the information generating unit is configured to generate the three dimensional information of the area to be measured from: distance information to the area to be measured obtained from a light turnaround time between the irradiation with the laser light and the light reception by the light receiving unit; and position information of each of the first direction and the second direction obtained based on light sending control angles of the scanner upon the irradiation with the laser light.

4. A traveling body, comprising:
the laser radar device according to claim 1.

* * * * *